United States Patent [19]

Kotani et al.

[11] Patent Number: 5,262,459
[45] Date of Patent: Nov. 16, 1993

[54] WEATHER RESISTANT RESIN COMPOSITION

[75] Inventors: Kozo Kotani; Taiichi Sakaya, both of Osaka, Japan

[73] Assignee: Sumitomo Chemical Company Limited, Osaka, Japan

[21] Appl. No.: 890,107

[22] Filed: May 29, 1992

[30] Foreign Application Priority Data

May 29, 1991 [JP] Japan ................. 3-125847

[51] Int. Cl.$^5$ ............. C08K 5/3417; C08K 5/16; C08K 5/10; C08K 5/07
[52] U.S. Cl. ................. 524/91; 524/208; 524/291; 524/336; 524/337; 524/413; 524/414; 524/415
[58] Field of Search .......... 524/386, 387, 388, 377, 524/91, 336, 337, 291, 208, 415, 414, 413, 408

[56] References Cited

U.S. PATENT DOCUMENTS

| | | | |
|---|---|---|---|
| 2,510,777 | 6/1950 | Gray | 524/414 |
| 2,956,983 | 10/1960 | Rindtorff et al. | 524/387 |
| 3,052,646 | 9/1962 | Doggett | 524/377 |
| 3,228,898 | 1/1966 | Illing et al. | 524/414 |
| 3,300,442 | 1/1967 | Darby et al. | 524/336 |
| 3,342,850 | 9/1967 | Newland et al. | 524/291 |
| 3,535,249 | 10/1970 | Larson | 524/418 |
| 3,691,131 | 9/1972 | Klemchuk | 524/414 |
| 3,880,805 | 4/1975 | Needham | 524/336 |
| 4,504,615 | 3/1985 | Mills | 524/387 |
| 4,939,237 | 7/1990 | Besso | 524/414 |
| 5,130,198 | 7/1992 | Swisher et al. | 524/106 |

FOREIGN PATENT DOCUMENTS

| | | |
|---|---|---|
| 1558350 | 2/1969 | European Pat. Off. |
| 0385278 | 9/1990 | European Pat. Off. |
| 0389640 | 10/1990 | European Pat. Off. |
| 3233951 | 3/1984 | Fed. Rep. of Germany |
| 3233952 | 3/1984 | Fed. Rep. of Germany |
| 3233953 | 3/1984 | Fed. Rep. of Germany |
| 2169298 | 7/1986 | United Kingdom |

*Primary Examiner*—Veronica P. Hoke
*Attorney, Agent, or Firm*—Birch, Stewart, Kolasch & Birch

[57] ABSTRACT

A weather resistant resin composition comprising a resin, a UV light absorber and a hypophosphite, which has improved weather resistance.

9 Claims, No Drawings

WEATHER RESISTANT RESIN COMPOSITION

BACKGROUND OF THE INVENTION

1. Field of the Invention

The present invention relates to a weather resistant resin composition. In particular, the present invention relates to a highly weather resistant resin composition containing a UV light absorber.

2. Description of the Related Art

An amount of the resins which are used outdoors is increasing year by year. Such the outdoor used resins are required to have weather resistance according to the applications. To this end, various weathering stabilizers have been developed.

One of notorious causes for deterioration of the resin which is exposed outdoors is ultraviolet (UV) light included in sunlight. A compound which absorbs the UV light is referred to as a UV light absorber and used as one of the weathering stabilizers.

However, the conventional UV light absorbers do not necessarily provide sufficient weather resistance to the resin since the resin composition containing the UV light absorber may suffer from deterioration due to insufficient weather resistance, for example, decrease of mechanical strength or change of gloss or color tone during outdoor exposure under some conditions.

Although increase of an amount of the UV light absorber to be added to the resin improves the weather resistance of the resin to some extent, the resin composition tends to be colored in a color tone of the UV light absorber, or the UV light absorber tends to bleed out on a surface of a bulk of the resin composition to impair its appearance.

SUMMARY OF THE INVENTION

An object of the present invention is to provide a highly weather resistant resin composition containing a UV light absorber and a specific additive.

According to the present invention, there is provided a weather resistant resin composition comprising a resin, a UV light absorber and a hypophosphite.

The addition of the hypophosphite to the resin composition comprising the resin and the UV light absorber improves the weather resistance greatly.

DETAILED DESCRIPTION OF THE INVENTION

In the present invention, the hypophosphite may be a compound of the formula (I):

$$X_a(H_2PO_2)_b \qquad (I)$$

wherein X is a metal ion, an ammonium ion or a quaternary phosphonium ion, and "a" and "b" are natural numbers, provided that a product of "a" and "c" is equal to "b" in which "c" is a valency of X.

Examples of the metal ion are ions of alkali metals, alkaline earth metals, transition metals and the like.

The ammonium ion may be substituted by at least one alkyl group having 1 to 20 carbon atoms, for example, methyl, ethyl, propyl, butyl, octyl or cetyl, or other groups (e.g. phenyl, benzyl, pyridyl, etc.).

Examples of the quaternary phosphonium ion are tetraalkylphosphonium ions in which the alkyl group has 1 to 20 carbon atoms (for example, methyl, ethyl, propyl, butyl, octyl or cetyl), tetraphenylphosphonium ion and the like.

Specific examples of the hypophosphite are lithium hypophosphite, sodium hypophosphite, potassium hypophosphite, magnesium hypophosphite, calcium hypophosphite, zinc hypophosphite, titanium hypophosphite, vanadium hypophosphite, molybdenum hypophosphite, manganese hypophosphite, cobalt hypophosphite, ammonium hypophosphite, butylammonium hypophosphite, diethylammonium hypophosphite, triethylammonium hypophosphite, tetraethylammonium hypophosphite, tetrabutylphosphonium hypophosphite, tetraphenylphosphonium hypophosphite, and the like. They may be used independently or as a mixture thereof.

Among them, sodium hypophosphite, potassium hypophosphite, lithium hypophosphite, calcium hypophosphite and magnesium hypophosphite are preferred.

The hypophosphite may be compounded in the resin composition as such or in the form of a solution in a polyhydric alcohol having a molecular weight of not larger than 50,000.

Preferred examples of the polyhydric alcohol are ethylene glycol, diethylene glycol, polyethylene glycol having a molecular weight of 150 to 50,000, propylene glycol having a molecular weight of 134 to 50,000, glycerin, diglycerin, hexaglycerin, trimethylolpropane and the like.

The UV light absorbers to be used in the present invention include benzophenone base UV light absorbers, benzotriazole base UV light absorbers, benzoate base UV light absorbers and cyanoacrylate base UV light absorbers. Preferred examples of the UV light absorber are compounds of the following formulas (1) to (9):

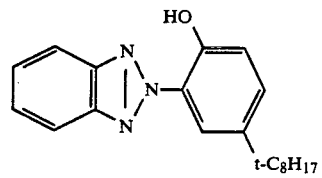
(1)

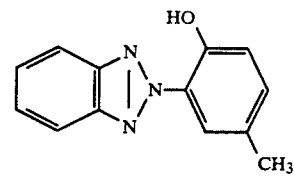
(2)

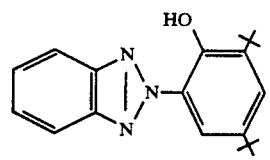
(3)

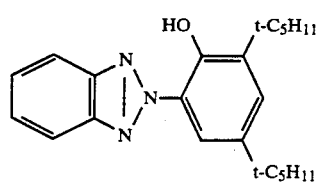
(4)

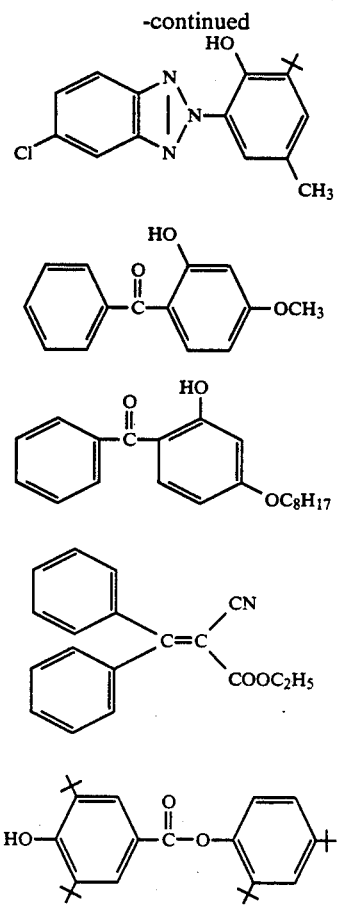

Examples of the resin to be used in the present invention are olefin polymers such as olefin homopolymers (e.g. polyethylene, polypropylene, poly-1-butene, poly-4-methyl-1-pentene, etc.), olefin copolymers (e.g. ethylenepropylene block copolymer, ethylene-propylene random copolymer, ethylene-1-butene copolymer, ethylene-1-hexene copolymer, ethylene-4-methyl-1-pentene copolymer, ethylene-1-octene copolymer, propylene-1-butene copolymer, etc.), copolymers of an olefin and a polar vinyl compound (e.g. ethylene-vinyl acetate copolymer, ethylene-methyl methacrylate copolymer, etc.), and ionomer resins; acrylic resins such as polymethyl methacrylate; polyester resins; polyamide resins; polycarbonate resins; phenol resins; polyvinyl chloride resins; polyurethane resins; and the like.

Among them, the following olefin polymers are preferred: polyethylene, polypropylene, poly-1-butene, poly-4-methyl-1-pentene, ethylene-propylene block copolymer, ethylene-propylene random copolymer, ethylene-1-butene copolymer, ethylene-1-hexene copolymer, ethylene-4-methyl-1-pentene copolymer, ethylene-1-octene copolymer, propylene-1-butene copolymer, ethylene-vinyl acetate copolymer, ethylene-methyl methacrylate copolymer and the like.

Amounts of the components of the resin composition according to the present invention are as follows:

The UV light absorber is used in an amount of 0.01 to 10 parts by weight, preferably 0.05 to 2 parts by weight, per 100 parts by weight of the resin. When the amount of the UV light absorber is smaller than 0.01 parts by weight, the weather resistance of the resin is not sufficiently increased. When the amount of the UV light absorber exceeds 10 parts by weight, the weather resistance is not further improved significantly and such large amount of the UV light absorber is uneconomical. In addition, the UV light absorber tends to bleed out.

The hypophosphite is used in an amount of 0.001 to 100 parts by weight, preferably 0.01 to 50 parts by weight, more preferably 0.05 to 5 parts by weight, per 1 part by weight of the UV light absorber. When the amount of the hypophosphite is smaller than 0.001 parts by weight, weather resistance of the resin composition is not sufficiently improved. When the amount of the hypophosphite exceeds 100 parts by weight, weather resistance is not further improved and such large amount of the hypophosphite is uneconomical.

The resin composition of the present invention may contain an antioxidant, an anti-fogging agent, an antistatic agent, a lubricant, a filler, a flame retardant, a pigment and the like in such amount that the effects of the present invention are not deteriorated.

A compounding manner of the above components is not critical, and the components are compounded by a usual means such as a Banbary mixer, a mixing roll, an extruder and the like.

According to the present invention, the resin composition containing the UV light absorber and the hypophosphite has excellent weather resistance.

The resin composition of the present invention is molded in the form of a film, a sheet, fibers and a molded article and used in various fields such as an agricultural film, an automobile parts material, etc. In particular, the film produced from the resin composition of the present invention comprising, as the resin, the polyolefin such as polyethylene or the ethylene-1-butene copolymer, or the ethylene-vinyl acetate copolymer is very useful as a wrapping film and a covering material for agricultural green houses or tunnels. The resin composition of the present invention is useful as a material for outdoor use which is required to have high weather resistance such as an automobile parts, for example, a bumper, or construction materials such as a roof of a garage.

PREFERRED EMBODIMENTS OF THE INVENTION

The present invention will be illustrated by the following Examples, which do not limit the scope of the present invention. In Examples, "parts" are by weight.

The test method in Examples is as follows:

Weathering Test

A test sample in the form of a JIS No. 1 dumbbell is aged with Standard Sunshine Super Long Life Weather Meter (trade name) (manufactured by Suga Shikenki Kabushikikaisha) at 83° C. on a black panel while spraying water on the sample surface for 18 minutes every 2 hours. Then, the aged sample is subjected to a tensile test using Autograph (trade name) DSS 100 (manufactured by Shimadzu Co.) to measure elongation (%) and the weathering test time at which the elongation decreases to a half of the original elongation value (a half value period of weather resistance) is recorded. The larger half value period means better weather resistance.

EXAMPLE 1

With 100 parts of low density polyethylene (SUMIKASEN (trademark) F208-0 manufactured by Sumitomo Chemical Co., Ltd.), were mixed 0.08 parts of 2,6-di-tert.-butyl-4-methylphenol (SUMILIZER (trademark) BHT manufactured by Sumitomo Chemical Co., Ltd.), 0.2 parts of tetraquis[methylene-3-(3′,5′-di-tert.-butyl-4′-hydroxyphenyl)propionate]-methane (SUMILIZER (trademark) BP-101 manufactured by Sumitomo Chemical Co., Ltd.), 0.13 parts of 4,4′-thiobis(3-methyl-6-tert.-butylphenol) (SUMILIZER (trademark) WXR manufactured by Sumitomo Chemical Co., Ltd.), 0.3 parts of stearamide, 2.0 parts of sorbitan sesquipalmitate, 5.0 parts of silica (Silton (trade name) PF-06 manufactured by Mizusawa Chemical Co., Ltd.). To the mixture, a UV light absorber and a hypophosphite shown in Table 1 were added and then the mixture was kneaded by a Banbary mixer at 150° C. for 5 minutes and pelletized by an extruder to obtain pellets. The pellets were molded by inflation molding at 180° C. to form a film having a thickness of 50 μm, which was subjected to the weathering test.

The result is shown in Table 1, The film had excellent weather resistance.

COMPARATIVE EXAMPLE 1

In the same manner as in Example 1 but using no hypophosphite, a film was produced and subjected to the weathering test. The result is shown in Table 1. The film had poorer weather resistance than the film of Example 1.

EXAMPLE 1

In the same manner as in Example 1 but using a UV light absorber of Table 1, a film was produced and subjected to the weathering test. The result is shown in Table 1. The film had excellent weather resistance.

COMPARATIVE EXAMPLE 2

In the same manner as in Example 2 but using no hypophosphite, a film was produced and subjected to the weathering test. The result is shown in Table 1. The film had poorer weather resistance than the film of Example 2.

TABLE 1

| Example No. | UV light absorber (parts) | Sodium hypophosphite (parts) | Half value period of weather resistance (hrs) |
| --- | --- | --- | --- |
| 1 | UVA 130[1] (0.3) | 0.2 | 580 |
| Comp. 1 | UVA 130 (0.3) | 0 | 150 |
| 2 | UVA 300[2] (0.3) | 0.2 | 370 |
| Comp. 2 | UVA 300 (0.3) | 0 | 150 |

Notes:
[1] SUMISORB (trademark) 130 manufactured by Sumitomo Chemical Co., Ltd.

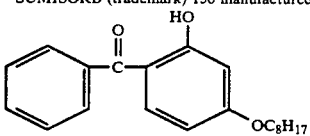

[2] SUMISORB (trademark) 300 manufactured by Sumitomo Chemical Co., Ltd.

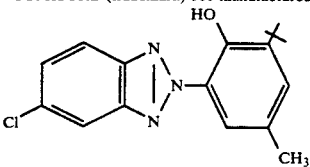

EXAMPLES 3-6

With 100 parts of an ethylene-vinyl acetate copolymer (EVATATE (trademark) D 2011 manufactured by Sumitomo Chemical Co., Ltd.), 0.08 parts of 2,6-di-tert.-butyl-4-methylphenol (SUMILIZER (trademark) BHT manufactured by Sumitomo Chemical Co., Ltd.), 0.2 parts of tetraquis[methylene-3′-(3′,5′-di-tert.-butyl-4′-hydroxyphenyl)propinatel-methane (SUMILIZER (trademark) BP-101 manufactured by Sumitomo Chemical Co., Ltd.), 0.3 parts of stearamide, 2.0 parts of sorbitan sesquipalmitate, 5.0 parts of silica (Silton (trade name) PF-06 manufactured by Mizusawa Chemical Co., Ltd.) were mixed. To the mixture, a UV light absorber and a hypophosphite shown in Table 2 were added and then the mixture was kneaded by a Banbary mixer at 150° C. for 5 minutes and pelletized by an extruder to obtain pellets. The pellets were molded by inflation molding at 180° C. to form a film having a thickness of 75 μm, which was subjected to the weathering test.

The result is shown in Table 2, The film had excellent weather resistance.

COMPARATIVE EXAMPLES 3 and 4

In the same manner as in Examples 3-6 but using a UV light absorber shown in Table 2 in an amount of Table 2 and no hypophosphite, a film was produced and subjected to the weathering test. The result is shown in Table 2. The films had poorer weather resistance than the film of Examples 3-6.

TABLE 2

| Example No. | UV light absorber (parts) | Hypophosphite (parts) | Half value period of weather resistance (hrs) |
| --- | --- | --- | --- |
| 3 | UVA 130 (1.0) | Sodium hypophosphite (0.2) | 760 |
| 4 | UVA 130 (1.0) | Solution A[1] (0.15) | 600 |
| 5 | UVA 300 (1.0) | Sodium hypophosphite (0.2) | 630 |
| 6 | UVA 300 (1.0) | Solution A[1] (0.15) | 570 |
| Comp. 3 | UVA 130 (1.0) | — | 400 |
| Comp. 4 | UVA 300 (1.0) | — | 300 |

Note:
[1] Diethylene glycol containing 20% by weight of sodium hypophosphite.

What is claimed is:

1. A weather resistant resin composition comprising an olefin polymer, a UV light absorber and a hypophosphite, wherein said hypophosphite is a compound of the formula (I):

$$X_a(H_2PO_2)_b \qquad (I)$$

wherein X is a metal ion, an ammonium ion or a quaternary phosphonium ion, and "a" and "b" are natural numbers, provided that a product of "a" and "c" is equal to "b" in which "b" is a valency of X; and wherein said UV light absorber is at least one compound selected from the group consisting of benzophenone base UV light absorbers, benzotriazole base UV light absorbers, benzoate base UV light absorbers and cyanoacrylate base UV light absorbers;

said UV light absorber being present in an amount of from 0.01 to 10 parts by weight per 100 parts by weight of said olefin polymer, and said hypophosphite being present in an amount from 0.001 to 100 parts by weight per 1 part by weight of said UV light absorber.

2. The weather resistant resin composition according to claim 1, wherein said hypophosphite is at least one compound selected from the group consisting of lithium hypophosphite, sodium hypophosphite, potassium hypophosphite, magnesium hypophosphite, calcium hypophosphite, zinc hypophosphite, titanium hypophosphite, vanadium hypophosphite, molybdenum hypophosphite, manganese hypophosphite, cobalt hypophosphite, ammonium hypophosphite, butylammonium hypophosphite, diethylammonium hypophosphite, triethylammonium hypophosphite, tetraethylammonium hypophosphite, tetrabutylphosphonium hypophosphite and tetraphenylphosphonium hypophosphite.

3. The weather resistant resin composition according to claim 1, wherein said hypophosphite is in the form of a solution in a polyhydric alcohol having a molecular weight of not larger than 50,000; and
wherein said polyhydric alcohol is an alcohol selected from the group consisting of ethylene glycol, diethylene glycol, polyethylene glycol having a molecular weight of 150 to 50,000, propylene glycol having a molecular weight of 134 to 50,000, glycerin, polyglycerin having a molecular weight of 166 to 50,000, pentaerythritol and trimethylolpropane.

4. The weather resistant resin composition according to claim 1, said amount of said hypophosphite is from 0.01 to 50 parts by weight per 1 part by weight of the UV light absorber.

5. The weather resistant resin composition according to claim 1, wherein said amount of said UV light absorber is from 0.05 to 2 parts by weight per 100 parts by weight of said olefin polymer.

6. The weather resistant resin composition according to claim 1, wherein said amount of said hypophosphite is from 0.05 to 5 parts by weight per 1 part by weight of the UV light absorber.

7. The weather resistant resin composition according to claim 1, wherein said UV light absorber is a compound selected from the group consisting of:

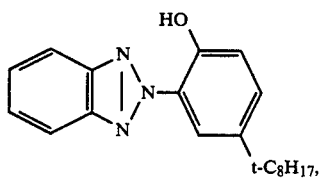 (1)

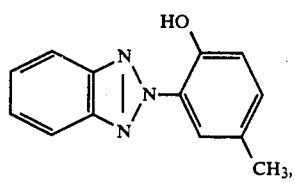 (2)

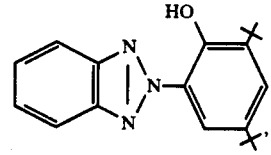 (3)

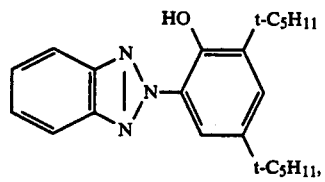 (4)

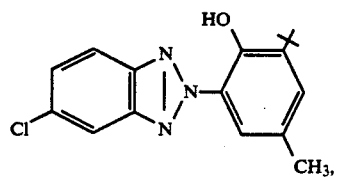 (5)

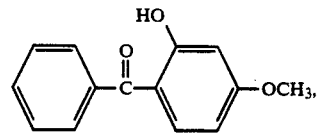 (6)

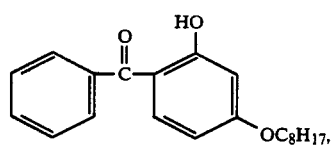 (7)

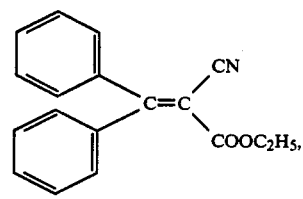 (8)

and

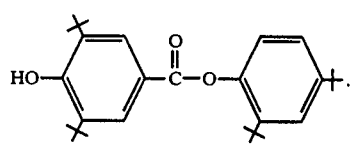 (9)

8. The weather resistant composition according to claim 1, wherein said olefin polymer is selected from the group consisting of polyethylene, polypropylene, poly-1-butene, poly-4-methyl-1-pentene, ethylene-propylene block copolymer, ethylene-propylene random copolymer, ethylene-1-butene copolymer, ethylene-1-hexane copolymer, ethylene-4-methyl-1-pentene copolymer, ethylene-1-octene copolymer, propylene-1-butene copolymer, ethylene-vinyl acetate copolymer, and ethylene-methyl methacrylate copolymer.

9. The weather resistant resin composition according to claim 1, wherein an amount of said hypophosphite is from 0.05 to 5 parts by weight per 1 part by weight of the UV light absorber.

* * * * *